No. 861,123. PATENTED JULY 23, 1907.
N. JOMINI.
MEANS FOR REMOVING SAND BARS IN WATERCOURSES, &c.
APPLICATION FILED JAN. 10, 1905.
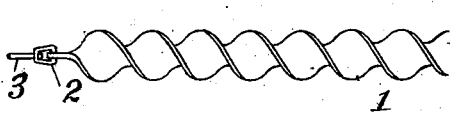
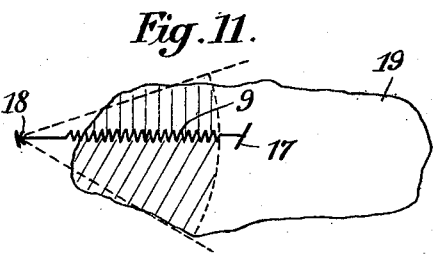
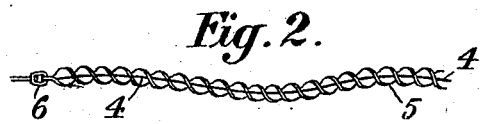
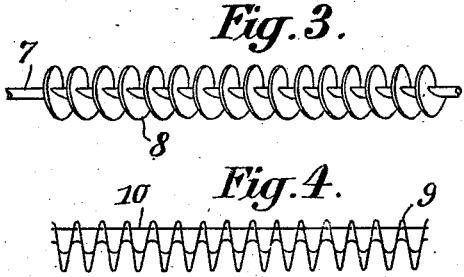
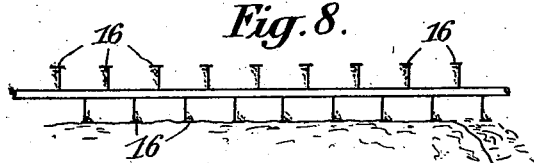
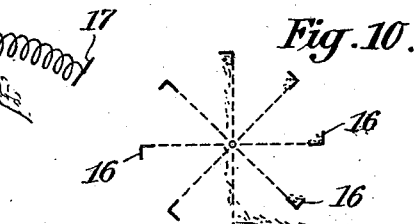
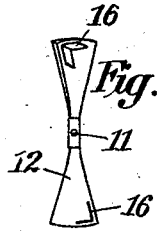
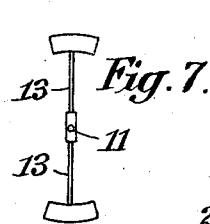
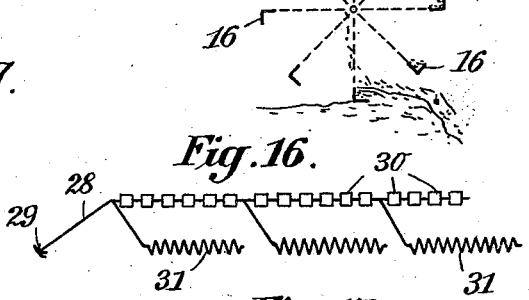
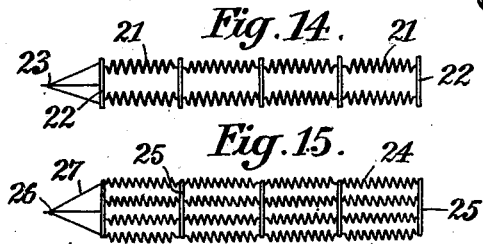
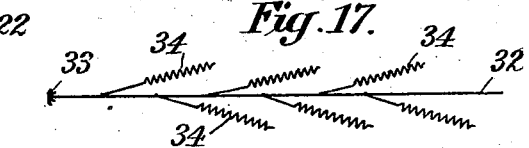
Witnesses
Jn Kuhn
John A. Brewal
Inventor
Nikolaus Jomini
By Richard
Att'ys

UNITED STATES PATENT OFFICE.

NIKOLAUS JOMINI, OF ST. PETERSBURG, RUSSIA.

MEANS FOR REMOVING SAND-BARS IN WATER-COURSES, &c.

No. 861,123.　　　　　Specification of Letters Patent.　　　　Patented July 23, 1907.

Application filed January 10, 1905. Serial No. 240,435.

*To all whom it may concern:*

Be it known that I, BARON NIKOLAUS JOMINI, a subject of the Emperor of Russia, residing at St. Petersburg, in the Empire of Russia, have invented a new and useful Means for Removing Sand Bars in Water-Courses, &c., and Apparatus Therefor, of which the following is a specification.

My invention relates to apparatus for removing sand-banks, bars, battures etc., leveling, widening and deepening beds of rivers and channels, and straightening rivers or river-banks etc.

The invention consists in turning or stirring up and partly lifting the earth or soil by means of a device or a plurality of devices, which can be moved or turned by the natural current of water, so that the earth or soil thrown up or lifted may be carried away by the current of water and deposited on another place.

The apparatus or devices for carrying out this invention may be of any suitable construction. Preferably such devices are given the shape of a screw, somewhat like ordinary conveying screws, and they are arranged to turn either around their own axis or on rigid or flexible supporting bodies, such as rods, ropes, wire ropes or the like, or they may consist of a series of sections of a screw similar to ordinary propeller-screws, which are united by spirally wound bands secured in their external ends; also they may be provided with scoops for digging the soil. The screws may be revolubly connected with a convenient anchored rope or cable at the one end and with an adjustable rudder at the other end. The supporting bodies, such as rods, ropes, wire ropes or the like, may be connected with a moored rope at the one end and with an adjustable rudder at the other end, so that they may be gradually turned through any desired angle to the direction of the current of water. The adjustable rudders may be of any suitable construction. The screws of the various constructions indicated can be put into rotation by the current of water, so that they can turn or stir up the soil either directly or with the aid of wings, scoops or the like, in order that the soil particles thrown up or lifted may be carried away with the current of water. By conveniently varying the position or direction of such dredging screws a sand-bank, bar, batture or the like can be gradually removed, also the bed of a river or channel can be leveled down, widened and deepened, and rivers or river-banks can be gradually straightened.

I will now proceed to describe my invention, reference being had to the accompanying drawings, in which—

Figure 1 is an elevation of a part of a single dredging screw adapted to revolve about its own axis, Fig. 2 is an elevation of a part of a dredging screw adapted to turn on a flexible wire rope or the like, Fig. 3 is an elevation of a dredging screw adapted to turn on a rigid metallic rod, Fig. 4 is an elevation of a single dredging screw without a supporting rod or the like, its turns being stiffened by an eccentrically disposed wire or rod, Fig. 5 is an elevation of a part of a dredging screw formed of a plurality of sections of a screw similar to propeller screws and made partly of wood and partly of metal, Fig. 6 is a vertical cross section through the same and shows a single section, Fig. 7 is a similar cross section and shows a modified section, Fig. 8 is a vertical section and shows diagrammatically the manner, in which a dredging screw according to Fig. 5 operates, Fig. 9 is a similar vertical section and shows diagrammatically the manner, in which a dredging screw according to Fig. 1 or 3 operates, Fig. 10 is a vertical cross section through the dredging screw in Fig. 5 and shows diagrammatically the manner in which the same operates, Fig. 11 is a plan and illustrates the manner, in which a sand bank may be removed by means of a dredging screw gradually turned to a side with the aid of an adjustable rudder, Fig. 12 shows in plan a dredging device, which is composed of five distinct dredging screws in a single row, Fig. 13 shows a similar device composed of several alternating right-hand and left-hand dredging screws in a single row, Fig. 14 shows in plan a dredging device composed of eight dredging screws in two rows, Fig. 15 shows in plan a dredging device composed of sixteen dredging screws in four rows, Fig. 16 shows in plan a dredging device composed of a moored wire rope and several separate dredging screws attached to the former, and Fig. 17 shows in plan a moored rope and a plurality of dredging screws attached severally to the same.

As already mentioned, the device for carrying out the method according to my invention preferably consists of a dredging screw, which is arranged to be put into rotation by the natural current of the water. This dredging screw may be made of a strip of sheet metal, which is twisted to form a screw 1 in Fig. 1, pointed at the one end and pivotally connected with a swivel 2, while the latter is connected with a moored cable 3. The other end of the screw 1 (not shown) is pivotally connected with an adjustable rudder of any suitable construction. Then the whole dredging screw is held by the anchor in the soil, while it remains at liberty to revolve and to turn to either side. The dredging screw may also be produced in the manner, that a strip of sheet metal is twisted around a supporting body, such as a flexible wire rope 4 in Fig. 2, and a screw 5 so formed is made to turn on the rope 4 between two collars 6, of which only the one is shown. The rope 4 may be connected at the one end direct with the respective anchor and provided at the other end with an adjustable rudder of any suitable construction. Instead of the flexible wire rope 4 also a rigid rod 7 in Fig. 3 may be employed, on which the screw 8 formed in any way and shape of sheet metal is made to turn under the action of the current of water. It will be obvious, that the screw 8 will in this case be prevented from bending on the sand-bank, batture, bed of a river or channel, or the like.

Where so preferred, the screw 9 in Fig. 4 formed of sheet metal may be stiffened by means of a wire or rod 10 passing through its turns parallel to its axis at a certain distance from the latter. Then the screw may be left without a supporting body in its axis, while it is prevented from extending by the wire or rod 10.

It may be preferable to so construct the dredging screw as to render its specific weight nearly equal or slightly larger than that of the water. Then this screw will be prevented from sinking or engaging too much into the soil, so that the necessary power for driving it and furnished by the natural current of water can be kept within reasonable limits. In such cases the dredging screw may be made partly of wood and partly of metal. An example for this is shown at Figs. 5 and 6. On a flexible supporting body 11, either a chain or a rope or a wire rope, a plurality of two-winged screws 12, 12 (similar to propeller screws), wholly or partly of wood, are mounted to turn, while they are kept aside by a plurality of disks or sleeves 14, 14 placed loosely or fastened on the supporting body 11. The external ends of all wings of these screws 12, 12 are connected by spirally wound bands 15, 15 of sheet metal.

Either on the wings (see Figs. 6, 8 and 10) or on the spiral bands 15, 15 suitable scoops 16, 16 are secured and adapted for turning up and lifting the soil. The screws 12, 12 may also be modified in a manner shown at Fig. 7, where they are denoted by 13, 13.

Evidently the dredging screw may be further modified in various respects without deviating from the spirit of my invention.

The dredging screws described so far are operated as follows: As already said above, either the one end of the screw 1 or 9 itself (Figs. 1 and 4) or the one end of the supporting body 4 in Fig. 2, 7 in Fig. 3 or 11 in Fig. 5 is connected with the anchor by means of a chain or wire rope and thereby secured, while the screw (1 in Fig. 1, 5 in Fig. 2, 12 or 13 in Figs. 5 to 7) is put into rotation by the natural current of water. Owing to its greater specific weight the dredging screw will engage in the soil and consecutively turn or stir up the soil, also its scoops 16, 16 will dig the soil, so that the soil thrown up will be carried away with the current of water and deposited on another place.

From an examination of Figs. 8 and 10 it will be clear, that the several scoops 16, 16 will consecutively cut into the soil and lift the soil to a height nearly equal to the diameter of the dredging screw, until the soil glides off and mixes with the water, when it will be carried off. In this manner the dredging screw will gradually proceed downward in the soil and remove the sand-bank, batture or the like. It is an advantage, that by reason of the small difference in specific weight between the dredging screw and the water the scoops will engage into the soil only to a small depth, so that the strength of the natural current of water will be ample for driving the dredging screw. A dredging screw of the shape shown at Figs. 1 to 4, however, acts in a similar manner as an ordinary conveying screw, by turning up the soil and moving the latter longitudinally until it drops on a deeper place, as is clearly shown at Fig. 9, if it is not carried away with the current.

It is evident, that the dredging screw, for instance 9 in Fig. 9, when left to itself, will bring itself into the direction of the water current. Now, however, that the dredging screw is required to level down a greater surface of the ground without shifting the place of its anchor 18, it is necessary, that it should occupy different positions, or in other words, it should shift about the anchor 18. For this purpose the mentioned rudder 17 is preferably attached to the free end of the screw 9 and in any suitable manner made adjustable. Then the current acting upon the rudder 17 will gradually turn the dredging screw 9 from its initial position in the direction of water indicated by the full lines in Fig. 11 to either side, so that at last the screw 9 may occupy either extreme inclined position indicated by the dotted lines. When the dredging screw 9 is gradually shifted to one side, it will sweep away the soil to the extent of the face marked by vertical lines in Fig. 11, and when shifted gradually to the other side, the screw will remove the soil from the face marked by inclined lines, the supposed sand-bank or batture being indicated by 19.

In the case the extent of the sand-bank, batture or the like is very large, it may be advisable to employ several dredging screws, which are connected one with another and with the single anchor as is clearly shown at Fig. 12. Each of these screws 20, 20 may have a length of for example 12 to 15 meters and can be transported easily, then connected with the others, couplings of any known construction may be used for connecting the several screws 20, 20 or their supporting bodies, as the case may be. These couplings may be provided with adjustable rudders (not shown). It is not necessary, that all of these screws should be of the same sense. Left hand and right hand screws may be alternately connected and even placed at an alternating incline to each other by means of conveniently adjusted rudders, as is indicated at Fig. 13. Should the extent of the sand-bank, batture or the like render it necessary, of course, two parallel rows of dredging screws 21, 21, Fig. 14, either all of the same sense, or partly right hand and partly left hand, may be arranged and connected by means of suitable cross bars 22, 22. The two rows of dredging screws 21, 21 or other supporting bodies, if there are any, are then connected with the common anchor 23. With the aid of conveniently disposed adjustable rudders (not shown) these two rows of screws can be made to level down the ground in a similar manner as is shown at Fig. 11. If needful, more than two rows of dredging screws may be employed. Fig. 15 shows for instance 4 rows of dredging screws 24, 24 connected with each other by several cross bars 25, 25 and with the common anchor 26 by suitable means 27, 27.

The manner of connecting the several dredging screws with each other and with the common anchor may be further varied, without deviating from the spirit of my invention. For example in Fig. 16 a long rope, wire rope or chain 28 is attached at both ends to two anchors 29 (of which only one is shown) and it is arranged for carrying a plurality of rollers 30, 30. On various places of the rope, wire rope or chain 28 several dredging screws 31, 31 are secured, which in turn are provided with adjustable rudders (not shown) for adjusting their positions with regard to the current of water. Or a long rope, wire rope or chain 32, Fig. 17, is attached to a single anchor 33, while on its two sides a plurality of single dredging screws 34, 34 is disposed and arranged to turn to the sides with the aid of adjustable rudders (not shown).

From the above description it will be evident, that the dredging device in either of the described modes of construction is eminently suitable for carrying out the method of removing sand-banks, bars, battures, etc., leveling, widening and deepening beds of rivers and channels, straightening rivers or river banks etc. The respective dredging device may be disposed on any place near the mouth of a river, or on the bed of a river or channel, and does not require any special attendance, since it is automatically driven by the current of water. When the rudder has been once adjusted and the device deposited in the direction of the water current, it may be left, as it will gradually level down the ground while constantly shifting to a side. The device does not impede the navigation, nor will it be disturbed by other circumstances, such as for example flakes or drifts of ice etc.

According to the extent of the work to be performed, the dredging device may be left to itself on its place for a longer or shorter time, even for several months or years. On places liable to constant silting up, the device or devices may be allowed to perform its or their work permanently for at once removing the fresh sand etc. When a dredging device should have performed its work in leveling down the ground to the desired depth, it may be transferred to another place of work by merely shifting its anchor.

The dredging devices may be varied in many respects without deviating from the spirit of the invention.

What I claim as my invention and desire to secure by Letters Patent, is:—

1. A dredging device adapted to be driven by the current of water, in combination with an anchor, and an adjustable rudder.

2. The combination with an anchor, of a plurality of dredging devices adapted to be turned by the current of water, means connecting said plurality of dredging devices with said anchor, and a plurality of adjustable rudders.

3. A dredging device in the shape of a straight conveyer screw and adapted to be connected with an anchor and to be turned by the current of water.

4. A dredging device in the shape of a conveyer screw and adapted to be turned by the current of water, in combination with an anchor, and an adjustable rudder.

5. The combination with an anchor of a dredging device in the shape of a conveyer screw and adapted to be turned by the current of water, means connecting the one end of said dredging device with said anchor, and an adjustable rudder adapted to be connected with the other end of said dredging device for turning same to either side.

6. The combination with an anchor, of a plurality of dredging devices in the shape of conveyer screws and adapted to be turned by the current of water, means connecting said plurality of dredging devices with said anchor, and a plurality of adjustable rudders.

7. A dredging device made of sheet metal, which is twisted in the shape of a conveyer screw, and adapted to be pivotally connected with an anchor by means of a chain and to be turned by the current of water.

8. A dredging device made of sheet metal, which is twisted in the shape of a conveyer screw, and adapted to be turned by the current of water, in combination with an anchor, means pivotally connecting said dredging device with said anchor and an adjustable rudder pivotally connected with said dredging device.

9. A dredging device made of sheet metal, which is twisted in the shape of a conveyer screw, and adapted to be turned by the current of water, in combination with means preventing said dredging device from extending, an anchor, means pivotally connecting said dredging device with said anchor, and an adjustable rudder pivotally connected with said dredging device.

10. The combination with a rod, of a dredging device made of sheet metal, which is twisted in the shape of a conveyer screw, and adapted to turn on said rod under the action of the current of water, an adjustable rudder at the one end of said rod, and means connecting the other end of said rod with an anchor.

11. In a dredging device of the class described, the combination with a rod, of a plurality of propeller screws mounted on said rod, to turn, means for preventing said plurality of propeller screws from longitudinally shifting, a plurality of spirally wound bands connecting the external wing ends of said plurality of propeller screws, an adjustable rudder at the one end of said rod, and means for connecting the other end of said rod with an anchor.

12. In a dredging device of the class described, the combination with a rod, of a plurality of propeller screws mounted on said rod to turn, means for preventing said plurality of propeller screws from longitudinal shifting, a plurality of spirally wound bands connecting the external wing ends of said plurality of propeller screws, a plurality of scoops on the wings of said plurality of propeller screws, an adjustable rudder at the one end of said rod, and means for connecting the other end of said rod with an anchor.

13. In a dredging device of the class described, the combination with a rod; of a plurality of propeller screws mounted on said rod to turn, means for preventing said plurality of propeller screws from longitudinally shifting, a plurality of spirally wound bands connecting the external wing ends of said plurality of propeller screws, a plurality of scoops on said plurality of spirally wound bands, an adjustable rudder at the one end of said rod, and means for connecting the other end of said rod with an anchor.

14. The combination with an anchor, of a plurality of dredging devices in the shape of conveyer screws and adapted to be turned by the current of water and provided each at the one end with an adjustable rudder, and means connecting said plurality of dredging devices in a single row with said anchor.

15. The combination with an anchor, of a plurality of rods each provided at the one end with an adjustable rudder, a plurality of dredging devices in the shape of conveyer screws and adapted to turn on said plurality of rods under the action of the current of water, and means connecting said plurality of rods in a single row with said anchor.

16. The combination with an anchor, of a plurality of dredging devices in the shape of conveyer screws and adapted to be turned by the current of water and provided each at the one end with an adjustable rudder, and means connecting said plurality of dredging devices in a plurality of parallel rows with said anchor.

17. The combination with an anchor, of a plurality of rods each provided at one end with an adjustable rudder, a plurality of dredging devices in the shape of conveyer screws and adapted to turn on said plurality of rods under the action of the current of water, and means connecting said plurality of rods with said anchor.

18. The combination with an anchor, of a chain or wire rope connected therewith at the one end, a plurality of dredging devices in the shape of conveyer screws and adapted to be turned by the current of water and provided each at the one end with an adjustable rudder, and means for pivotally connecting the other ends of said plurality of dredging devices with said chain or wire rope.

19. The combination with an anchor, of a chain or wire rope connected therewith at the one end, a plurality of rods connected with said chain or wire rope on various places, a plurality of dredging devices in the shape of conveyer screws and adapted to turn on said plurality of rods under the action of the current of water, and a plurality of adjustable rudders connected with the other ends of said plurality of rods.

In testimony whereof I have signed my name to this specification in the presence of two subscribing witnesses.

NIKOLAUS JOMINI.

Witnesses:
A. E. JACOBSON,
JOHN MUELLER.